United States Patent [19]

Gruss

[11] Patent Number: 4,685,345
[45] Date of Patent: Aug. 11, 1987

[54] APPARATUS FOR CONVERTING ROTARY MOTION TO TRANSLATORY MOTION

[76] Inventor: Alder R. Gruss, 18 Kewanee Rd., New Rochelle, N.Y. 10804

[21] Appl. No.: 773,999

[22] Filed: Sep. 9, 1985

[51] Int. Cl.⁴ .............................................. F16H 27/02
[52] U.S. Cl. ................... 74/424.8 C; 74/25; 74/89
[58] Field of Search ........... 74/25, 424.8 C, DIG. A, 74/DIG. B, 89, 89.15

[56] References Cited

U.S. PATENT DOCUMENTS

| 453,564 | 8/1985 | Hauptman | 74/25 |
| 2,619,346 | 11/1952 | Weathers | 74/DIG. A |
| 2,648,991 | 8/1953 | Henry | 74/424.8 C |
| 2,831,363 | 4/1958 | Lohr | 74/424.8 C |
| 3,656,357 | 4/1972 | Corwin | 74/25 X |
| 3,990,317 | 11/1976 | Gilman et al. | 74/25 |
| 4,131,028 | 12/1978 | Gilman et al. | 74/25 |
| 4,203,328 | 5/1986 | De Boynton | 74/DIG. B |

Primary Examiner—Richard J. Scanlan, Jr.
Assistant Examiner—Joseph A. Fischetti
Attorney, Agent, or Firm—Emil Richard Skula

[57] ABSTRACT

An apparatus for converting rotary motion to translatory motion. The apparatus contains shaped rollers located therein so that the longitudinal axis of the rollers forms an acute angle with the longitudinal axis of a shaft passing through the apparatus. The rollers are contained in a cylindrical housing having end pieces. The rollers are shaped to have maximum contact with the shaft. Roller race means and spring means contained within the housing retain the rollers and provide a load to maintain tight shaft to roller contact. Rotation of the apparatus about a shaft causes a shaft to move in a longitudinal direction, while rotation of the shaft within the apparatus causes the apparatus to move in a longitudinal direction.

7 Claims, 8 Drawing Figures ability to withstand heavy loads.

APPARATUS FOR CONVERTING ROTARY MOTION TO TRANSLATORY MOTION

TECHNICAL FIELD

The field of art to which this invention relates is motion conversion apparatuses, specifically, an apparatus for converting rotary motion into translatory motion.

BACKGROUND ART

Engines or motor which generate power typically transfer this power through an angularly rotating shaft. Similarly, hand operated machines typically have power input through an angularly rotated shaft or crank. It is frequently necessary to convert this rotary motion to translatory motion to perform a particular function. This conversion can be accomplished through means known in the art such as a rack and pinion gear arrangement, a threaded screw and nut, a drive wheel and belt, etc. The threaded screws and nuts of the prior art have been improved by incorporating ball bearings into the nuts to reduce friction losses.

The devices of the prior art have numerous disadvantages such as high cost, short service life and mechanical inefficiency. The inefficiency tends to increase with increasing load transferred.

It is known in the art that a roller in contact with a shaft such that the longitudinal axis of the roller is skewed at an acute angle with the longitudinal axis of the shaft will rotate and move the direction of the shaft's longitudinal axis when the shaft is angularly rotated. Conversely, when the roller is angularly rotated, the shaft will move in a translational manner. For example, U.S. Pat. No. 3,081,639 discloses a mechanism containing skewed rollers for moving a shaft, wherein the mechanism is rotated about the nonrotatable shaft, thereby causing the shaft to move in a linear fashion. U.S. Pat. No. 3,990,317 discloses a wire feeding mechanism comprising inclined or skewed rollers in a frame. Rotation of the frame about a wire causes the wire to move linearly through the central channel of the frame. U.S. Pat. No. 4,131,028 similarly discloses a motion conversion mechanism for moving wire, wherein the skewed rollers in contact with the wire are driven by separate drive rollers. These motion conversion devices of the prior art have numerous disadvantages including complex drive mechanisms, the need for heavy complex frames, low load limitations, inadequate roller to shaft contact, short roller life and mechanical inefficiency. In addition, the rollers of the prior art are either coiled wire rollers or flexible rollers which do not have high load handling ability or service life.

Accordingly, what is needed in this art is an apparatus for converting rotary motion to translatory motion, or translatory motion to rotary motion, which has a minimum number of parts, a simple frame, long-life rollers, high efficiency and which can withstand heavy loads.

DISCLOSURE OF INVENTION

It is an object of the present invention to provide an apparatus for converting rotary motion to translatory motion, or translatory motion to rotary motion.

According to the present invention, an apparatus comprising a cylindrical housing with end pieces and holes therethrough is fitted onto a shaft. A plurality of tapered rollers is contained within the housing. The rollers are specially shaped or tapered to have maximum contact with the shaft when skewed at a predetermined acute angle from the longitudinal axis of the shaft. The housing contains bearing race means and spring load means to retain the rollers and force a tight fit of the rollers to the shaft. An optional roller retaining means within the housing spatially retains the rollers around the shaft in a fixed position relative to each other.

Another aspect of this invention is the aforementioned apparatus having threaded rollers for fitting onto a threaded shaft.

Other features and advantages will be apparent from the specification and claims and from the accompanying drawings which illustrate an embodiment of the invention.

BEST MODE FOR CARRYING OUT THE INVENTION

Figure 2:
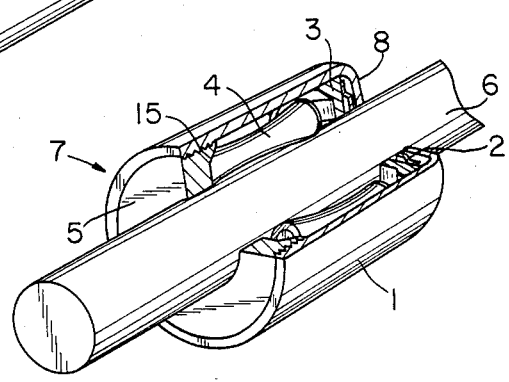
FIG. 2 is a partial cut-away view of an assembly showing the elements of the apparatus of the present invention.

As best shown in FIG. 2, the apparatus 7 is made up of cylindrical housing 1, first end piece 8, spring means 2, race means 3, rollers 4, and second end piece 5. The apparatus 7 is fitted over shaft 6. Shaft 6 is a solid cylindrical bar or tubing. Shaft 6 has a relatively smooth surface.

Figure 1:
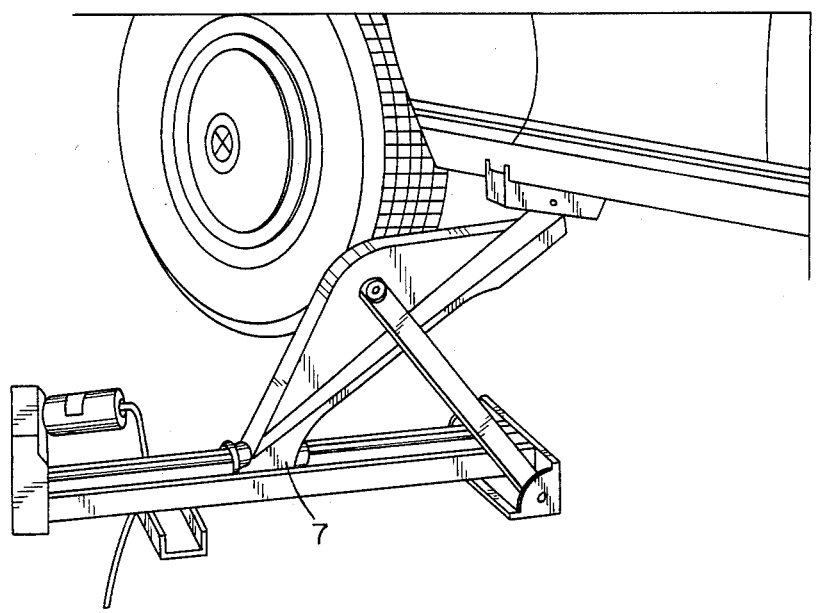
FIG. 1 is a three-dimensional pictorial view of a preferred embodiment of the motion conversion apparatus of this invention.

The operation of the apparatus 7 is best illustrated in FIG. 1. A rotary input to shaft 6 will cause rotatably restrained apparatus 7 to move in a longitudinal direction along the longitudinal axis of the shaft. Conversely, rotation of apparatus 7 around shaft 6 will cause rotatably restrained shaft 6 to move transversely with respect to mechanism 7.

Figure 3:
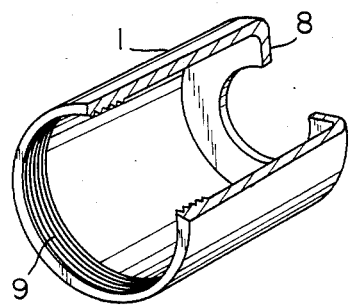
FIG. 3 is a partial cut-away view of a cylindrical housing of the apparatus.

FIG. 3 shows cylindrical housing 1 with fixed end piece 8 having a hole axially therethrough for receiving shaft 6. The cylindrical housing 1 has internal threads 9 at the opposite end for receiving removable second end-piece 5. Optionally, end piece 8 may be removable having mounting means for mating with the housing 1.

Figure 4:
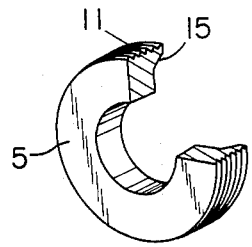
FIG. 4 is a cross-sectional side view of the end bearing cap of the apparatus.

FIG. 4 shows a cross section of removable second end-piece 5. Second end-piece 5 comprises a disc having a hole through the center thereof for receiving shaft 6. End-piece 5 has screw threads 10 around its outer peripheral surface. Screw threads 10 mate with internal screw threads 9 when end-piece 5 is mated with cylindrical housing 1. The inner surface 15 of end-piece 5 is beveled inward around the outer periphery to form roller race 11.

Figure 5:
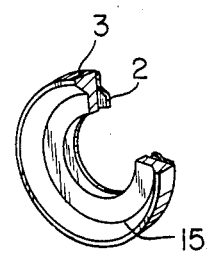
FIG. 5 is a cross-sectional view of a bearing race and a Belleville spring used in the apparatus of the present invention.

FIG. 5 shows a cross-sectional view of roller race 3 and Belleville spring 2. Roller race 3 is a disc having a central hole therethrough for receiving shaft 6. The outer face of roller race 3 is flat while the inner face is beveled radially and axially inward around the outer periphery at 15 to form a retaining surface for the rollers. Although a Belleville spring 2 is used to load the rollers 4 in a preferred embodiment, it will be recognized by those skilled in the art that equivalent spring means may be used to load the rollers.

Figure 6:
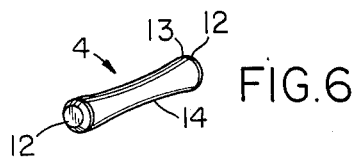
FIG. 6 is a three-dimensional view of a roller according to the present invention.

Roller 4 as shown in FIG. 6 is an example of a preferred embodiment of a roller according to the present invention. Roller 4 has flat end face 15 on each end perpendicular to the longitudinal axis thereof. Roller 4 has beveled edge 12 at each end and flat portion 13 adjacent to beveled edge 12. Roller 4 has concave surface 14 inbetween flat portions 13. Concave surface 14 is specially designed to maintain maximum contact with shaft 6 at any given skew angle from the longitudinal axis of shaft 6. The equation for the surface 14 of roller 4 is calculated by the following formula $$(x^2/a^2)+(y^2/b^2)=1$$

where a=semi major axis and bsemi minor axis and x and y are points on the elipse. The skew angle may vary from about 5° to about 25° with about 15° being a preferred angle.

Beveled ends 12 of rollers 14 contact roller race 3 and roller race 11 during operation of mechanism 7.

Figure 7:
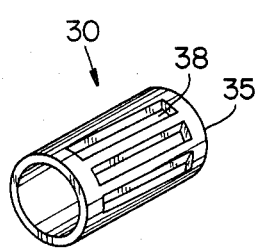
FIG. 7 is a three-dimensional view of retainer optionally used in the apparatus.

Optionally, a retaining means can be inserted in mechanism 7 to maintain the relative positions of rollers 4. An embodiment of a retaining means cage 30, is shown in FIG. 7. Cage 30, has hollow cylindrical frame 35 through which shaft 6 passes. Openings 38 contained in frame 35 receive rollers 4 and maintain the spacing of rollers 4 relative to each other.

The inward sides of roller race 3 and roller race 4 are typically normal to the longitudinal axis of shaft 6 as shown in FIG. 2. Optionally, the inward faces of the roller races may be parallel to the end faces 15 of the rollers.

Figure 8:
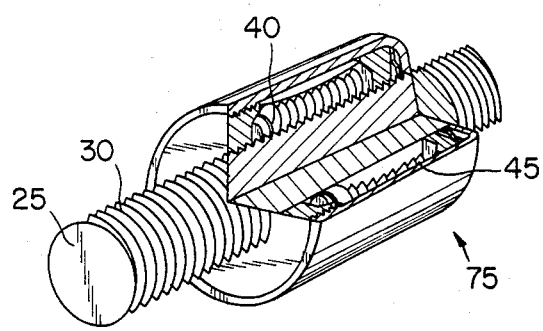
FIG. 8 is a partial cut-away view of an embodiment of the present invention having a threaded shaft and threaded rollers.

Another embodiment of the present invention is illustrated in FIG. 8. Apparatus 75 surrounds shaft 25. Shaft 25 has a threaded surface 30. Rollers 40 have threaded surface 45 which mates with threaded surface 30. It is important to note that the mode of operation of apparatus 75 is identical to that of nonthreaded apparatus 7 of FIG. 2. The threads are present in applications where a positive mechanical stop is required in the event that sudden unexpected high impact or high force loads are directed to apparatus 75. Apart from the threads, apparatus 75 is otherwise similar to apparatus 7.

The materials which can be used to construct the apparatus 7 are those known in the art and must be sufficiently hard to be durable, and sufficiently ductile to be machinable. Typical materials include various type of steel, stainless steel, metal alloys, etc. It is also contemplated that one or more components of apparatus 7 can be fabricated from fiber reinforced composite materials such as a resin matrix and polyaramide, graphite or glass fibers. In addition, one skilled in the art will appreciate that apparatus 7 may be fabricated from plastics such as the thermosetting or thermoplastic polymers. In order to prolong roller life it is desirable to coat the rollers and bearing races with various metallic coatings such as silver and various polymeric coatings.

Apparatus 7 has many uses. In particular when power must be converted from the rotary to linear modes, e.g., in rotary jacks, various machinery, etc. The apparatus may be used to replace hydraulic cylinders for moving a shaft a distance under a high load. In addition, when it is desirable to convert linear motion to rotary motion (e.g., a plunger type solenoid), the apparatus of the present device will be useful.

Although this invention has been shown and described with respect to detailed embodiments thereof, it will be understood by those skilled in the art that various changes in form and detail thereof may be made without departing from the spirit and scope of the claimed invention.

I claim:

1. An apparatus for converting motion comprising:
   a cylindrical housing having a first end piece, said end piece having a centrally located hole therethrough for receiving a shaft, said housing having an attachment means at the other end;
   a second end piece comprising a removable disc having a centrally located hole therethrough along the longitudinal axis thereof for receiving a shaft, said disc having an attachment means cooperable with the attachment means located on the housing;
   a plurality of shaped rollers spaced equidistantly within said housing, the rollers having a curved concave surface, said curved surface described by an eliptical equation so as to provide contact with the shaft along the axial length of the rollers, said rollers skewed at an acute angle with the longitudinal axis of the shaft, the curved surface of each roller contacting only the shaft, said rollers having ends for cooperation and engagement with a race means;
   at least one race means within said housing for retaining and engaging the ends of rollers, wherein the race means comprises a substantially planar surface having an inward projecting rim means for engaging the ends of the rollers, said flat planar surface perpendicular to the longitudinal axis of the shaft or perpendicular to the longitudinal axis of the skewed rollers; and
   spring means within said housing for providing a compressive load on said rollers, the race means and spring means contained within the housing, whereby a shaft inserted through said apparatus, so that said rollers are in close contact with the shaft, when rotated angularly will cause said apparatus to move in a longitudinal direction; and, angular rotation of the apparatus about the shaft will cause the shaft to move in a longitudinal direction.

2. The apparatus of claim 1 wherein the shaft and rollers are threaded with mating threads.

3. The apparatus of claim 1 additionally comprising a retainer means within the housing in contact with the rollers to maintain the spacing of the rollers relative to each other.

4. The apparatus of claim 2 additionally comprising a retainer means within the housing in contact with the rollers to maintain the spacing of the rollers relative to each other.

5. The apparatus of claim 1 wherein both end pieces are removable and comprise disc with central holes therethrough for receiving a shaft and means for attachment to the housing, said housing having attachment means on each end for receiving the end pieces.

6. The apparatus of claim 1 wherein the race means are plated with silver to reduce wear and provide lubricity between the surfaces of the rollers and the race means.

7. A method of converting rotary motion to translatory motion and translatory motion to rotary motion using the apparatus of claim 1.

* * * * *